United States Patent

Mecklenburg

[15] 3,699,516

[45] Oct. 17, 1972

[54] FORWARD-ACTING ERROR CONTROL SYSTEM

[72] Inventor: Paul Mecklenburg, Fort Lee, N.J.

[73] Assignee: Bell Telephone Laboratories, Incorporated, Murray Hill, N.J.

[22] Filed: Jan. 18, 1971

[21] Appl. No.: 107,316

[52] U.S. Cl. .......................................340/146.1 AQ

[51] Int. Cl. .............................................G06f 11/12

[58] Field of Search ..........340/146.1 AQ, 146.1 AV; 235/153

[56] References Cited

UNITED STATES PATENTS

| | | | |
|---|---|---|---|
| 3,508,197 | 4/1970 | Tong | ......................340/146.1 |
| 3,588,819 | 6/1971 | Tong | ......................340/146.1 |
| 3,593,282 | 7/1971 | Tong | ......................340/146.1 |

*Primary Examiner*—Charles E. Atkinson
*Attorney*—R. J. Guenther and Kenneth B. Hamlin

[57] ABSTRACT

Apparatus for providing error detection and correction in data transmission systems includes a plurality of exclusive-OR circuits and delay registers. Switches responsive to control circuitry selectively apply data bits, as they are generated, to the exclusive-OR circuits and delay registers which, in turn, generate a number of partially completed check bits. As the check bits are completed in the encoder, they are inserted in the data stream. Check bits similarly generated in a decoder are, compared with the received check bits and the results of this comparison used to locate errors in the data stream. Error correction circuitry then corrects the indicated errors.

18 Claims, 21 Drawing Figures

INVENTOR
P. MECKLENBURG
BY R. A. Ryan
ATTORNEY

| | DATA PHASE A | DATA PHASE B | DATA PHASE C | DATA PHASE D | DATA PHASE E | CHECK PHASE | DATA PHASE A |
|---|---|---|---|---|---|---|---|
| 301 | 1 | 0 | 1 | 0 | 1 | 0 | 1 |
| 302 | 1 | 0 | 0 | 1 | 1 | 0 | 1 |
| 303 | 0 | 1 | 1 | 1 | 1 | 0 | 0 |
| 304 | 1 | 1 | 1 | 1 | 1 | 1 | 1 |

| | DATA PHASE A | DATA PHASE B | DATA PHASE C | DATA PHASE D | DATA PHASE E |
|---|---|---|---|---|---|
| $S_4$ | 1 | 0 | 1 | 0 | 1 |
| $S_3$ | 1 | 0 | 0 | 1 | 1 |
| $S_2$ | 0 | 1 | 1 | 1 | 1 |
| $S_1$ | 1 | 1 | 1 | 1 | 1 |

FIG. 7
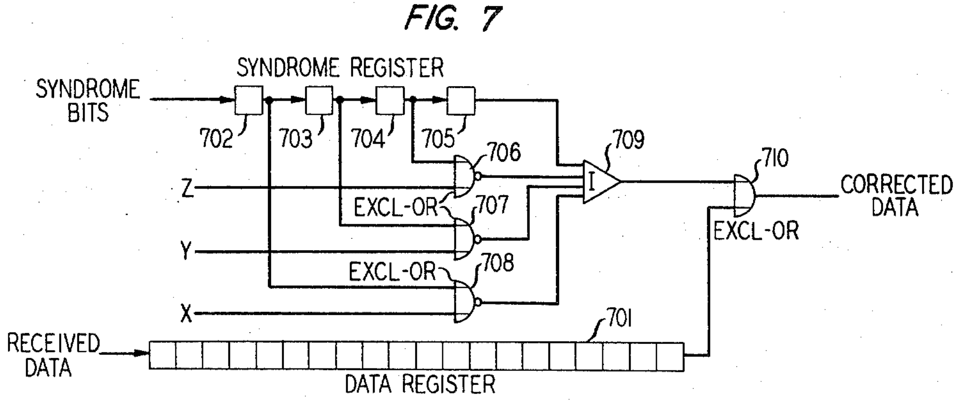
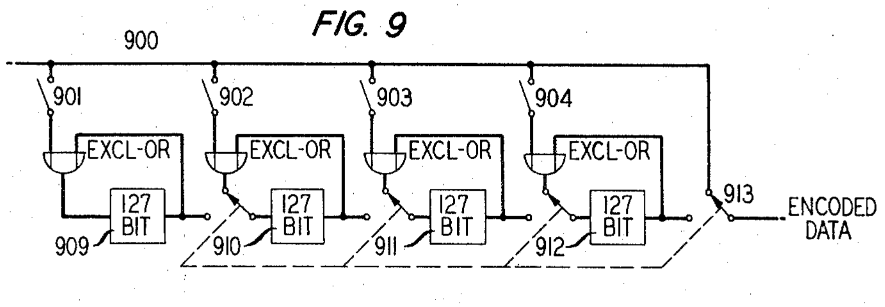
FIG. 12
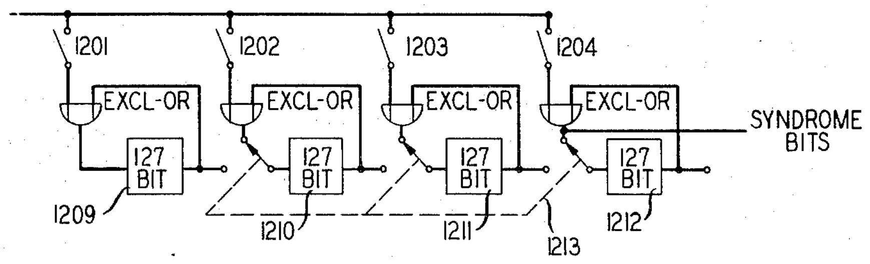
FIG. 13
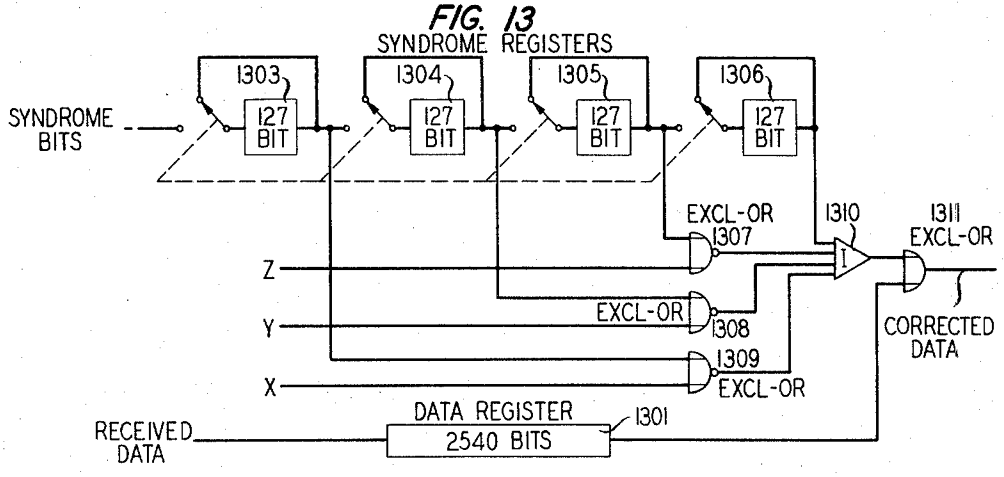

FORWARD-ACTING ERROR CONTROL SYSTEM

BACKGROUND OF THE INVENTION

1. Field of the Invention

This invention relates to data transmission systems and more particularly to error detection and correction circuits for such systems.

2. Description of the Prior Art

The use of data communications systems has increased greatly in recent years. As a result, telephone and other communications facilities have been adapted for communicating information in the form of a discrete number of signals rather than as a continuous range of signals, typical of the previously used telephone applications. Along with the increased use of communications systems for transmitting and receiving digital information for use with data processing and similar systems there has arisen a need for greater accuracy of those communications systems.

Many techniques and apparatus have been introduced into data communications systems to improve the accuracy of received data. Early examples of such apparatus are described, for example, in *Data Transmission* by W. R. Bennett and J. R. Davey, McGraw Hill Book Co., 1965, pp. 295 et seq. and D. W. Hagelbarger U.S. Pat. No. 2,956,124, issued Oct. 11, 1960. More recent improvements in data communications error detecting and correcting systems are described in H. O. Burton et al. U.S. Pat. No. 3,389,375, issued June 18, 1968, and R. L. Townsend et al. U.S. Pat. No. 3,475,724, issued Oct. 28, 1969.

In most data communications systems including an error detection or correction facility, a continuous sequence of input data signals is typically divided into groups or blocks of signals for encoding. These input signals are usually in the form of discrete signals representing binary 1's and 0's. To these input blocks are appended or interspersed a (usually shorter) sequence of check or parity signals. Each of these check signals is usually based on the values of a prescribed pattern of input signals. In a typical error control context, a block of, say, M input binary signals (bits) will have associated with it a sequence of, say, C check bits. If M+C=N, it is often said that the code is an (N,M) code; a code using N bits in each transmitted block, of which M are input information bits.

At a receiver in a typical error-controlled data communication system, a decoder performs another encoding of the noncheck bits in each received block, thereby generating a second set of check bits. Based on a comparison of the received check bits and the locally generated check bits, it is possible to produce so-called error syndrome signals which indicate the presence of any errors in the received information bits. The location of the errors may also be indicated, in which case correction may then be effected.

The above-cited references disclose a number of types of apparatus and methods for introducing check bits into and removing them from the transmitted data stream. Most prior art apparatus for performing these functions, however, have required storage devices, such as shift registers, of sufficient capacity to provide for the simultaneous sampling of the input data bits necessary to the complete specification of one or more check bits. This often requires the storing of all of the input data signals in a transmitted block.

It is therefore an object of the present invention to reduce the amount of storage needed for encoding a sequence of input data signals.

Complex control circuitry is often required in prior art systems to direct the application of input data signals to appropriate parts of encoding circuitry to effect the required encoding operations.

It is therefore another object of the present invention to provide for the more efficient generation of check bits.

SUMMARY OF THE INVENTION

The apparatus of the present invention includes simplified economical circuitry for recording the data bit contribution to each of a group of check bits as the data bits are shifted bit by bit to transmission circuitry. Switches responsive to control circuitry selectively apply the data bits, as they appear for transmission, to exclusive-OR and delay circuitry which record the contributions of a data bit to a number of partially completed check bits. As a check bit is completed it is inserted in the data stream for transmission. Decoding circuitry in the receiver of the transmission system generates check bits from the received data bits just as the encoder circuitry did for the input data bits before transmission. A comparison of the received and locally generated check bits pinpoints errors in the received data stream which are then corrected by correction circuitry in the decoder.

It is therefore a feature of the present invention that circuitry for storing partially generated check bits be provided.

It is another feature that circuitry be provided for modifying these stored check bits in accordance with appropriate ones of the input data bits as they arrive. Typically, a single data bit will cause one or more of the stored check bits to be modified.

It is still another feature that apparatus be provided for transmitting a particular check bit when all of the input data bits which contribute to the formation of that check bit have been transmitted.

These and other features of the present invention will become more clearly understood upon considering the following detailed description of an illustrative embodiment of the present invention presented in connection with the accompanying drawing, wherein:

FIG. 7 shows an error correcting circuit used in a typical embodiment of the present invention.

FIG. 9 is an encoder for a typical embodiment of the present invention utilizing a code interleaved to degree 127.

FIG. 12 shows the syndrome generator utilized in the preferred embodiment of the present invention for correcting burst errors.

FIG. 13 shows an error correction circuit used in one embodiment of the present invention for correcting bursts of errors in a data stream.

DETAILED DESCRIPTION OF THE INVENTION

Figure 1A:
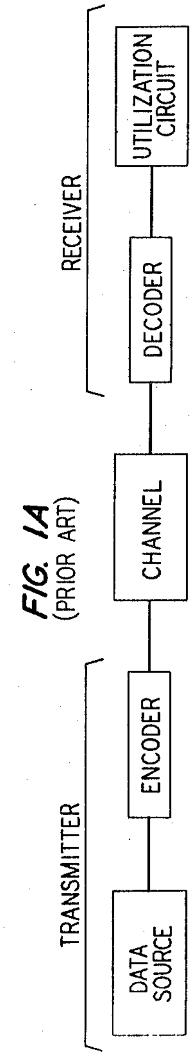
FIG. 1A (PRIOR ART)
FIG. 1A shows a typical error-controlled data communication system known in the prior art.

FIG. 1A is a block diagram representation of a general data communication system of a known type to which the present invention is applicable. In a system such as that shown in FIG. 1A, a data source provides data signals which are applied to an encoder. The encoder generates parity bits and intersperses them among or adds them to the data signals for transmission via a channel. A decoder, using both the received data signals and the parity bits received via the channel ascertains and corrects errors introduced into the data stream during transmission. The corrected data signals are then available for application to utilization circuitry.

The preferred embodiment of the present invention includes novel encoding and decoding circuitry for performing the parity or check bit generation and for effecting error detection and correction. In order to facilitate a full understanding of the preferred embodiment, a description of the code utilized in the preferred embodiment is presented.

The Code (Noninterleaved)

The circuitry of the preferred embodiment utilizes a so-called (24,20) recurrent code, that is, there are 20 data bits and 4 check bits in every block of 24 bits. Recurrent codes are well known in the art. Such codes are described, for example, in *Error Correcting Codes* by W. W. Peterson, John Wiley and Sons, Inc., 1961 and in an article entitled "Analysis of Recurrent Codes" appearing in the *IEEE Transactions on Information Theory* by R. B. Ash and A. D. Wyner, July 1963, pp. 143–156.

The recurrent code used in the preferred embodiment of the present invention includes one check bit for every five data bits and will, in its simplified or noninterleaved form, correct single bit errors no closer than 24 bits apart. (The same code may be interleaved for correcting error bursts. The interleaved code will be described below.) Each parity bit of the simplified code checks 15 preceding data bits in accordance with a predetermined pattern. With $i$ and $j = 0$, this pattern is shown completely for check bits $c_5$ and $c_4$ in FIG. 2A and partially for check bits $c_3$, $c_2$ and $c_1$. The pattern can be conveniently thought of as a comb having an irregular set of missing teeth. The leftmost tooth having an arrowhead (for example that pointing to the box including check bit $c_4$) designates a check bit. The remaining 15 teeth of that comb designate the data signals which contribute to that check bit. By sliding the comb such that the leftmost tooth is on a check bit, the data bits contributing to that check bit are readily ascertained from the remaining teeth. Illustratively, if the comb having its arrowhead coincident with check bit $c_4$ is moved to the left such that the arrowhead is adjacent the box including check bit $c_5$, it is readily seen that check bit $c_5$ checks data bits $d_{25}$, $d_{24}$, $d_{23}$, $d_{22}$, $d_{21}$, $d_{20}$, $d_{19}$, $d_{18}$, $d_{17}$, $d_{15}$, $d_{14}$, $d_{11}$, $d_{10}$, $d_8$, and $d_6$. It is apparent from FIG. 2A that one check bit appears in the data stream after every group of five adjacent data bits.

It has been stated that the check bits check certain data bits or that certain data bits contribute to certain check bits. By this is meant that each check bit is formed by calculating the modulo-2 sum of all the data bits which that check bit checks. Thus, check bit $c_5$ is the modulo-2 sum of the 15 data bits enumerated above as contributing to $c_5$.

Figure 2A:
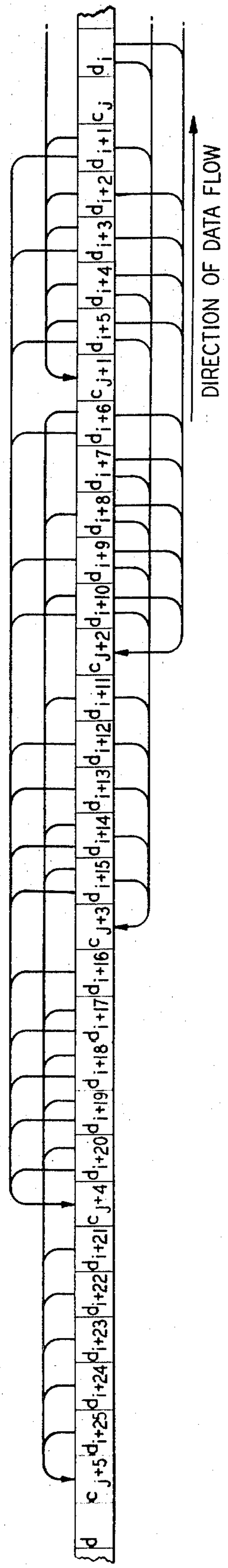
FIG. 2A shows the relationship between input bits and check bits in a typical code used in accordance with one embodiment of the present invention.
Figure 1B:
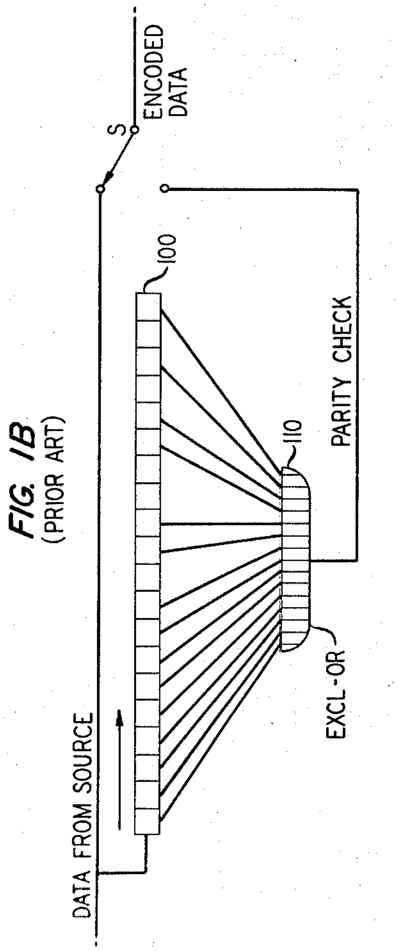
FIG. 1B (PRIOR ART)
FIG. 1B shows an encoder used in prior art error control systems.

Referring to FIG. 2A, it is noted that 15 out of 20 adjacent data bits are required for the complete formation of each check bit. A conventional encoder to effect such an encoding scheme is shown in FIG. 1B. The apparatus of FIG. 1B includes a shift register 100 having 20 shift register stages and an exclusive-OR circuit 110 for calculating the contribution of 15 of the 20 data bits to each check bit. The data bits are shifted to the right and a check bit is generated and inserted in the data stream following the shifting of five data bits. The preferred embodiment of the present invention is simpler and more economical than this conventional arrangement, as will be seen below.

Figure 2B:
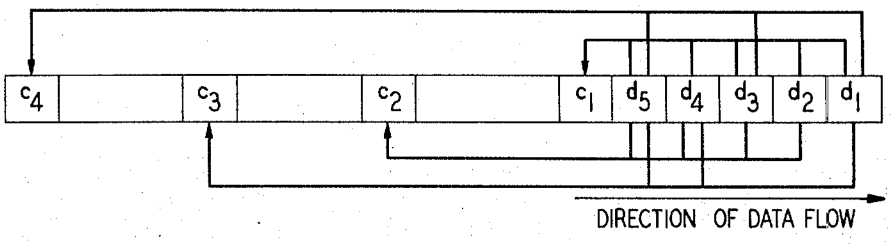
FIG. 2B is an abbreviated version of the code shown in FIG. 2A.
Figure 2C:
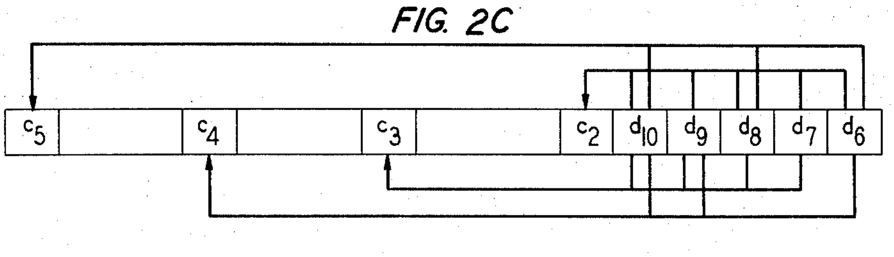
FIG. 2C shows a different portion of FIG. 2A.

Referring again to the drawing, it is noted that FIG. 2B is identical to FIG. 2A except that all but the first five data bits and the check bits to which they contribute have been deleted. Similarly, FIG. 2C shows only the next five data bits (bits $cl_6$ through $cl_{10}$) shifted six bit positions to the right such that they are aligned with the first five data bits of FIG. 2B, and the four check bits to which the second five bits contribute. It is apparent, from a comparison of FIGS. 2B and 2C that data bits $d_1$ through $d_5$ contribute to the succeeding four check bits in exactly the same manner as the next five data bits, $d_6$ through $d_{10}$, contribute to the four check bits succeeding them. Continuing in this manner, it becomes clear that all succeeding groups of five data bits, starting with a data bit immediately following a check bit, contribute to the succeeding four check bits in precisely the same fashion.

Specifically, a comparison of the code pattern of FIG. 2A and the more simplified arrangements of FIGS. 2B and 2C emphasizes the repetitive nature of the code and allows a convenient generalization. Before proceeding with the generalization, it is considered helpful to redesignate each of the five consecutive data bits following a check bit as data phase bits A through E depending on the position of the data bit relative to a check bit. Specifically, each data bit immediately following a check bit is a data phase A bit. The next succeeding data bit following a data phase A bit is a data phase B bit. Similarly, the data bit next succeeding a data phase B bit is a data phase C bit and so on. Illustratively, $d_1$ in FIG. 2B is a data phase A bit, $d_2$ is a data phase B bit, $d_3$ is a data phase C bit, $d_4$ is a data phase D bit and $d_5$ is a data phase E bit. Similarly, $d_6$ in FIG. 2C is a data phase A bit (as are data bits $d_{11}$, $d_{16}$ etc.), $d_7$ is a data phase B bit and so on. Analogously, the four check bits succeeding a particular occurrence of a data phase bit E are relabeled check phases F through I.

Generalizing, then, it may be said that a data phase A bit contributes to the check phase bits F, H and I. Similarly, a data phase B bit contributes to the check phase bits F and G, data phase bit C contributes to the check phase bits F, G and I, data phase bit D contributes to check phase bits F, G and H and data phase bit E contributes to check phase bits F, G, H and I.

Thus, in FIG. 2B, $d_1$, a data phase A bit, is seen to contribute to check bits $c_1$, $c_3$ and $c_4$ (check phase bits F, H and I). Again, $d_2$, a data phase B bit, is seen to contribute to $c_1$ and $c_2$, check phase bits F and G. Further, from FIG. 2C, it is clear that $d_6$, also a data phase A bit, contributes to check bits $c_2$, $c_4$ and $c_5$, check phase bits F, H and I and $d_7$, a data phase B bit, contributes to check bits $c_2$ and $c_3$, check phase bits F and G, respectively. Clearly, then, each group of five data phase bits (starting with a data bit immediately following a check bit) and the associated four check phase bits behave the same as all other such groups.

Figure 3:
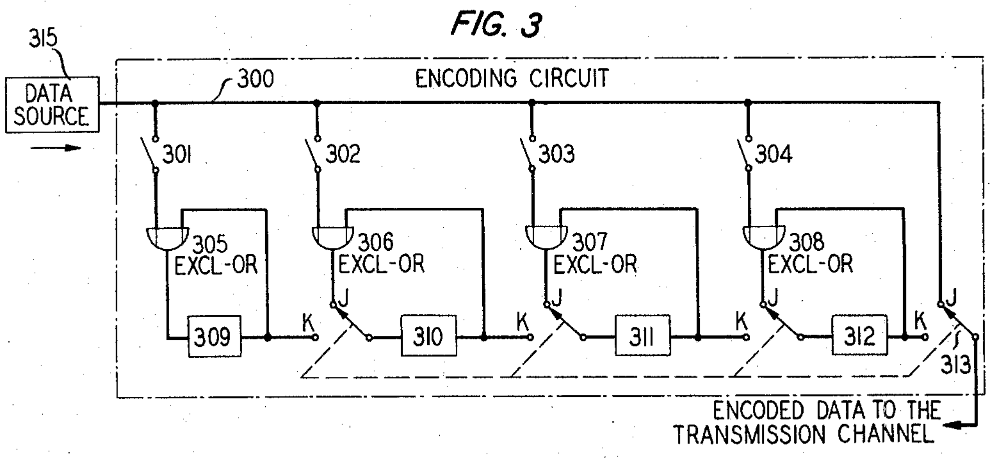
FIG. 3 shows the encoder of a typical embodiment of the present invention.

With the above discussion as background, it is recalled that in the conventional encoder of FIG. 1B, 15 of 20 consecutive data bits must be interrogated simultaneously to produce each check bit. The encoding circuit of the preferred illustrative embodiment of the present invention shown in FIG. 3 is a simplified economical circuit for encoding a data stream in accordance with the code described above. In particular, the circuit is arranged to cumulatively record the contribution of the data bits, one-by-one, as they are shifted to transmission circuitry for transmission via the channel of FIG. 1.

The Encoder

FIG. 3 illustrates the encoder of the preferred embodiment of the present invention. Referring to FIG. 3, then, it is seen that data bits are generated by data source 315 and shifted one-by-one to line 300. Switches 301, 302, 303 and 304 control the flow of data signals on line 300 to the exclusive-OR circuits 305, 306, 307 and 308, which record the contribution of each data bit to the proper check bit. The switches are, in turn, controlled by means of a so-called framing counter which will be discussed in detail below.

The circuit of FIG. 3 effects the simultaneous calculation of four check bits which are stored in partially completed form in one-bit shift registers 309, 310, 311 and 312. For example, referring to FIG. 2B, partially completed check bits $c_1$, $c_2$, $c_3$ and $c_4$ occupy single-stage shift registers 309, 310, 311 and 312 of FIG. 3, respectively. As data bit $d_1$ appears on line 300, switches 301, 302 and 304 are closed since $d_1$, a data phase A bit, contributes to check bits $c_1$, $c_3$ and $c_4$. During data phase A (the time during which a data phase A bit is being transmitted), the switches 301, 302 and 304 are closed. Exclusive-OR circuits 305, 306 and 308 effect modulo-2 addition of the data bit $d_1$ to the partially calculated check bits in shift registers 309, 310 and 312. During data phase B, switches 303 and 304 are closed. Thus, for the interval shown in FIG. 2B, data bit $d_2$ is added by means of switches 303 and 304 to the partially completed check bits $c_1$ and $c_2$ stored in shift registers 312 and 311 respectively. Similar statements may be made for each of the remaining three data phases with respect to switches 301, 302, 303 and 304, exclusive-OR circuits 305, 306, 307 and 308 and shift registers 309, 310, 311 and 312.

Looking again at data phase A of FIG. 2B, for a moment, it is apparent that data bit $d_1$ is the first data bit contributing to check bit $c_4$. Thus, just prior to data phase A, shift register 309 must be cleared. Data bit $d_1$ is then applied to shift register 309 by means of switch 301 and exclusive-OR circuit 305, the second input signal to exclusive-OR circuit 305 having the value 0. Similarly, during data phase B, data bit $d_1$ is reapplied, unaltered, by means of exclusive-OR circuit 305 to shift register 309 since there is again no second input to exclusive-OR circuit 305 (recalling that switch 301 is open during data phase B). During data phase C (switch 301 closed), however, data bit $d_3$ is applied to exclusive-OR circuit 305 together with the contents of shift register 309 — data bit $d_1$. The modulo-2 sum of $d_1$ and $d_3$ is then applied to shift register 309. Succeeding data bits contributing to check bit $c_4$ are similarly added, bit-by-bit, to the contents of register 309. Each of the exclusive-OR circuits 305, 306, 307 and 308, in this manner, cumulatively adds data bits applied to it by means of switches 301, 302, 303 and 304, respectively.

During the five data phases, the contact arms of switch 313 are in the positions shown in FIG. 3, that is, in contact with contact points J. Data bits are thus applied simultaneously to the encoding circuit and the transmission channel. During a check phase, however, the switch arms make contact with contact points K. Thus, a completed check bit stored in shift register 312 is applied to the transmission channel. In addition, a partially completed check bit in shift register 309 is shifted into shift register 310 and register 309 is then cleared. Also, the partially completed check bit in register 310 is shifted to shift register 311 and the partially completed check bit in shift register 311 is shifted into register 312. The switch arms of switch 313 then return to contact points J. Having started with data bit $d_1$ of FIG. 2B and proceeding sequentially through data bits $d_2$ through $d_5$ and check bit $c_1$, the next data bit on line 300 is data bit $d_6$ of FIG. 2C, again a phase A data bit. The appearance of $d_6$ on line 300 and the shifting of partially completed check bits once to the right as switch 313 changed positions, establishes the proper alignment of data bits and check bits as shown in FIG. 2C and the circuit continues in this manner to generate the check bits.

Figure 4A:
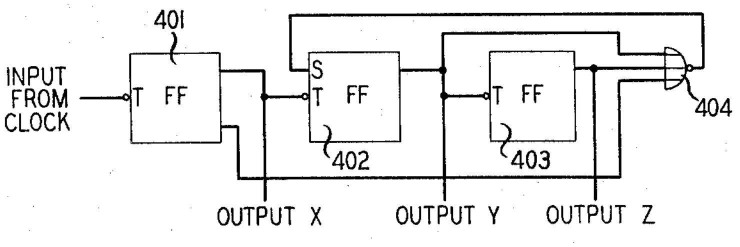
FIG. 4A shows control circuitry for a typical embodiment of the present invention.

The framing counter is a pulse division circuit of standard design for dividing the number of pulses from a pulse generator by the factor 6. One such counter, and the one utilized in the preferred embodiment, is shown in FIG. 4A. The waveforms associated with the counter of FIG. 4A are shown on FIG. 4B.

Figure 4B:
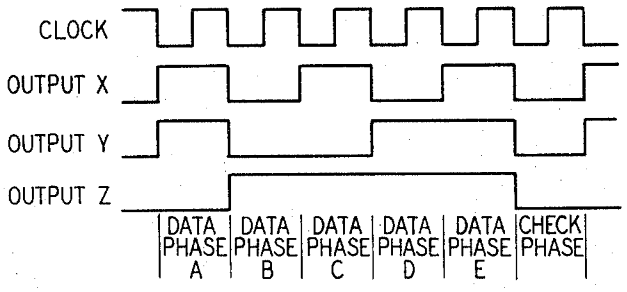
FIG. 4B shows typical waveforms generated by the control circuitry of FIG. 4A.

The circuit of FIG. 4A is a modification of a well-known circuit which operates in a somewhat unconventional fashion. Each of the flip-flops 401, 402 and 403 changes state in response to a negative pulse applied at its toggle or T input. Flip-flop 402, however, is equipped also with a set or S input. Application of a positive signal to the S input causes the flip-flop to assume the 1 state. As a result, flip-flop 401 will change state producing an output pulse at a rate half that of the clock signal shown in FIG. 4B. Similarly, if the output of gate 404 were not applied to the set input of flip-flop 402 flip-flop 402 would produce an output pulse half as often as flip-flop 401 and flip-flop 403 at a rate half again that of flip-flop 402, resulting in a total cycle of eight states that continually repeats itself. Gate 404, however, responds to the seventh state and applies a positive signal to set flip-flop 402, causing the circuit to return immediately to the first state. Thus, the pulse division circuit cycles through six states repetitively. FIG. 4B illustrates the waveforms produced at the output terminals of each of the flip-flops 401, 402 and 403, as well as the clock signal. The output signals from flip-flops 401, 402 and 403 are labeled outputs X, Y and Z, respectively.

Referring again to FIG. 4B, it is seen that the waveforms have been partitioned and labeled as data phases. Comparison of the data phases of both FIG. 4B (excluding the clock signal) and FIG. 4C (excluding the contribution to switch 304 which is closed during all five data phases) illustrates the correlation between the two. For example, output X and output Y during data phase A (FIG. 4B) are both high (in the 1 state) and output Z is low (in the 0 state). This corresponds to the first three entries in the data phase A column of FIG. 4C which reads, from top to bottom (excluding the clock pulse), 1,1,0. Similarly, output X and output Y during data phase B (FIG. 4B) are both low while output Z is high. This, in turn, corresponds to the first three entries in the data phase B column of FIG. 4C which, from top to bottom, includes the entries 0,0,1. Analogously, the pattern of output signals X, Y and Z for each data phase of FIG. 4B corresponds to the first three entries of the corresponding data phase column of FIG. 4C. Clearly, then, the framing counter of FIG. 4B generates signals appropriate to operate switches 301, 302 and 303.

A number of circuits which perform the switching functions of each of the switches 301, 302 and 303 (switch 304 being closed during each of the data phases) are well known in the art. One such circuit, for example, is a standard two-input AND gate, one input of which is connected to line 300 (FIG. 3) and the other input of which is connected to the appropriate output of the counter of FIG. 4A.

Decoder

Figures 4C, 5, 6B:
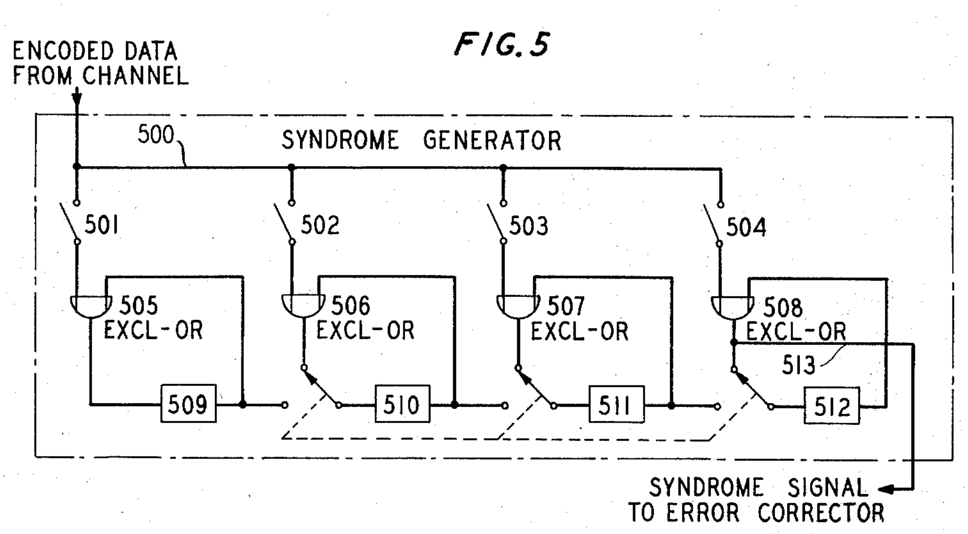
FIG. 4C is a table illustrating the sequence of operation of switches used in the encoder of FIG. 3.
FIG. 5 shows a syndrome generator for the decoder of a typical embodiment of the present invention.
FIG. 6B shows the pattern of FIG. 6A in tabular form.

The decoder of the preferred embodiment of the present invention in the receiver of a transmission system as shown in FIG. 1A includes circuitry for calculating so-called syndrome signals. These syndrome signals typically include a binary 1 whenever a mismatch occurs between a check bit generated at a receiver and a check bit received there. The syndrome generator shown in FIG. 5 is identical to the encoder of FIG. 3 except that the output of the syndrome generator is taken from the output terminal of the rightmost exclusive-OR circuit rather than from the shift register associated therewith (312 in FIG. 3).

The receiver of the system under discussion also includes a clock synchronized with the clock in the transmitter and a framing counter identical with that of FIG. 4A. Consequently, the signals produced by the framing counter in the transmitter are also available in the receiver; the receiver framing counter signals are in time synchronism with those of the transmitter. As in the transmitter encoder unit, the framing counter signals labeled output X, output Y and output Z are used in the receiver to operate switches 501, 502 and 503 of the syndrome generator. Thus, data bits transmitted to the receiver via the channel appear on line 500. As each of five consecutive data bits appears on line 500, its contribution to the four partially calculated check bits stored in the shift registers 509, 510, 511 and 512 is controlled by the switches 501, 502, 503 and 504 which, in turn, are controlled by the framing counter signals. That is, a set of check bits is generated in the receiver syndrome calculator just as they were in the transmitter encoder. As indicated above, following the incidence of five consecutive data bits on line 300 of the encoder, the data stream is interrupted and the check bit stored in the rightmost shift register (312) is shifted out to the channel. Consequently, the sixth bit appearing on line 500 of the syndrome calculator from the transmitter encoder and channel is a check bit developed by the transmitter encoder unit. The function of the syndrome generator is to develop a set of check signals from the same data bits and in the same manner as the encoder and to then compare the locally generated check signals with the received check signals.

Referring again to FIG. 2B, by analogy to the operation of the encoder, it is clear that following the incidence of the five data bits $d_1$, $d_2$, $d_3$, $d_4$ and $d_5$ on line 500, check bits $c_2$, $c_3$ and $c_4$ are partially completed and stored in shift registers 511, 510 and 509 and that check bit $c_1$ is completed and stored in shift register 512. During check phase 1, then, received check bit $c_1$ is on line 500 and switches 501, 502 and 503 are open (outputs X, Y and Z negative in FIG. 4B). Received check bit $c_1$ appearing on line 500 is as a result, applied only to the rightmost exclusive-OR circuit 508 by means of switch 504. As indicated above, shift register 512 includes the locally generated check bit $c_1$. Consequently, during the check phase, received check bit $c_1$ is added in modulo-2 fashion to the locally generated check bit $c_1$ by means of exclusive-OR circuit 508. The modulo-2 sum of the locally generated check bit and the received check bit is a syndrome signal which appears on line 513. If the locally generated check bit $c_1$ is the same as the received check bit $c_1$, then the syndrome signal is 0 in accordance with modulo-2 addition and if the locally generated check bit $c_1$ fails to match the received check bit $c_1$, the syndrome signal is a 1. The syndrome signal thus provides an indication of failure of correlation between the two check bits and, hence, of an error in the received data and check bit stream from which both were derived. As in the encoder unit, the cycle is repeated during the next five data phases until both the received check bit $c_2$ and the locally generated check bit $c_2$ are applied to exclusive-OR circuit 508.

Figure 6A:
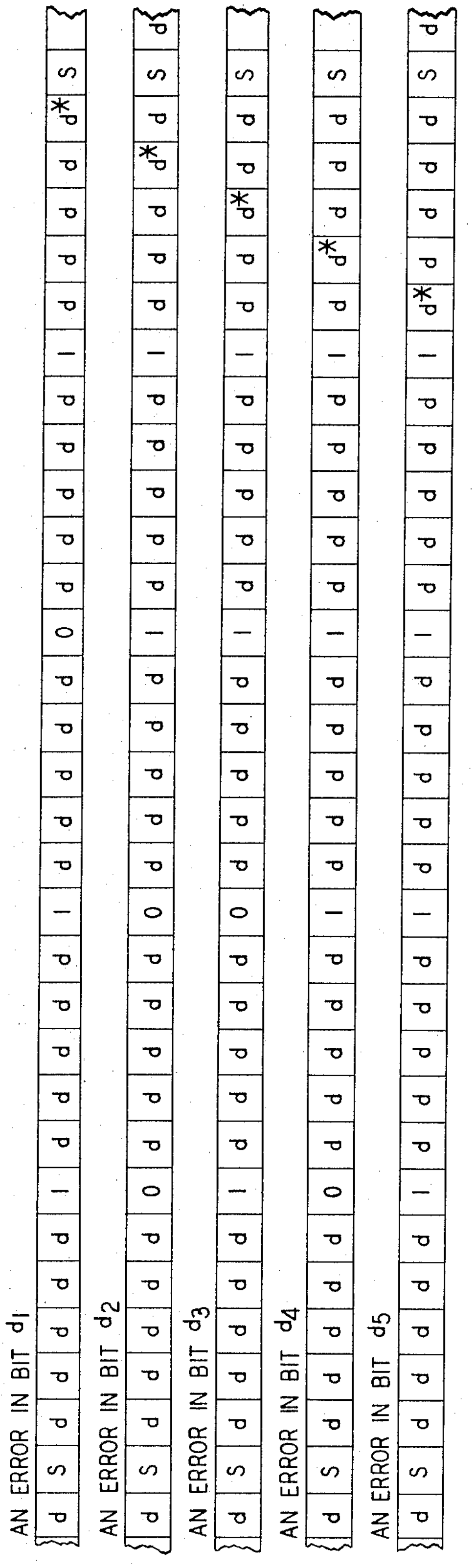
FIG. 6A shows the pattern of syndrome bits produced by the syndrome generator of FIG. 5 for particular data bit errors.

As stated, each data bit in FIG. 2A is checked by a unique combination of at most, four succeeding check bits. For example, data bit $d_1$ is checked by check bits $c_1$, $c_3$ and $c_4$, data bit $d_2$ is checked by check bits $c_1$ and $c_2$ and so on. Consequently, if data bit $d_1$ were received in error, the locally generated check bits $c_1$, $c_3$ and $c_4$ in the decoder would fail to correspond to the received check bits $c_1$, $c_3$ and $c_4$ and syndrome bits $s_1$, $s_3$ and $s_4$, the modulo-2 sum of the locally generated and received check bits bearing identical subscripts would be all 1's. Syndrome bit $s_2$ would be 0, however, since the locally generated check bit $c_2$ and the received check bit $c_2$ would agree, since they do not check data bit $d_1$. FIG. 6A illustrates the pattern of syndrome bits for an error in each of the rightmost five data bits in FIG. 2A. (The subscripts have been omitted and the digit in error marked with an asterisk.) Again, it is noted that data bits $d_6$ through $d_{10}$ are related to the four check bits succeeding them ($c_2$, $c_3$, $c_4$ and $c_5$) in the same manner that data bits $d_1$ through $d_5$ are related to check bits $c_1$, $c_2$, $c_3$ and $c_4$. It is apparent from FIG. 6A, then, that each error in the data stream is uniquely determined by the pattern of four successive syndrome signals.

As noted above, the receiver of the system of the present invention includes a framing counter like that shown in FIG. 4A for the encoder. The signals produced by the framing counter during five data phases are shown in FIG. 4B and are represented in binary notation in FIG. 4C. For purposes of this discussion, each of the columns of FIG. 4C will be referred to as a framing counter state. The framing counters in both the receiver and transmitter, of course, operate the switches effecting the contribution of a data bit to the appropriate check bits.

FIG. 6B illustrates the pattern of syndrome bits generated for a mismatch during each of the data phases. The entire patter of syndrome bits is cyclical, being repeated every five data bits. Comparison of the five leftmost entries in FIGS. 4C and 6B readily yields the conclusion that the states of the framing counter match the patterns of 1's and 0's of the syndrome generator for an error in each of the data phases.

The preferred embodiment of the present invention includes an error correction circuit as shown in FIG. 7. In accordance with the circuit of FIG 7, a 20-stage shift register 701 includes 20 data bits received from the channel. These same received data bits are used to generate a sequence of syndrome signals, one for every five data bits. These syndrome signals are shifted into the four syndrome register stages 702, 703, 704 and 705. Further the pulses generated by the decoder framing counter as outputs X, Y and Z are applied to the exclusive-OR circuits 706, 707 and 708 as shown in FIG. 7. If a match occurs between three of the syndrome bits and the framing counter pulses during one state of the framing counter (corresponding to the matching of the entries in the columns of FIGS. 4C and 6B) and the syndrome bit in shift register 702 is 1, a pulse is applied by the inverter 709 to alter the erroneous data bit applied to exclusive-OR circuit 710. Since the correction signified by the syndrome bits has been made, shift register stages 702, 703, 704 and 705 are then cleared to 0.

An example will better serve to explain operation of the circuit of FIG. 7. In accordance with this example, assume that data bit $d_3$ of FIG. 2A is received in error. During data phase 1, data bit $d_1$ occupies the rightmost stage of shift register 701 in FIG. 7. Since $d_3$ is in error, the syndrome register contains, from right to left, 1,1,0,1. At the same time, the framing counter state is 1,0,1,1 and three of these bits are applied as input signals to exclusive-OR circuits 706, 707 and 708. The leads labeled X, Y and Z are connected to the output leads from the framing counter in the receiver bearing the same designations. During data phase A, then, lead Z has a signal representing 0, lead Y has a signal representing a 1 and lead X has a signal representing a 1 (reading from row 3 upward in the data phase A column in FIG. 6B). Since there is no match between all the framing counter signals and all the syndrome register signals, the output of the gate 709 is 0. Consequently, the data phase A bit is unaltered by the exclusive-OR circuit 710. Again, since the data phase B signal has been assumed in our example to have been received correctly, there will be no match at the input to inverter 709. The output of inverter 709 will therefore be 0 and the phase B data bit will be unaltered by exclusive-OR circuit 710. Again, the data phase C bit $d_3$ has been assumed to be in error. As a result, the syndrome register stages will include the pattern of syndrome bits 1,1,0,1. Simultaneously, the signals 1,0,1 are applied to exclusive-OR circuits 706, 707 and 708, respectively. The resulting match causes all 1 signals to be applied to the gate 709. In response to an all 1's input indication, the gate 709 generates a signal which, when applied to exclusive-OR circuit 710 along with the data bit from register 701, causes the data bit to be inverted. It is noted that the length of the data shift register 701 is just sufficient to delay the data stream such that four check bits are generated in the receiver. Four check bits check each data bit and four check bits must be interrogated in order to generate a complete syndrome pattern.

The Interleaved Code

Figure 8C:
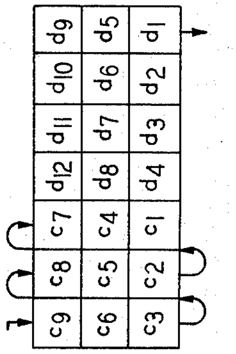
FIG. 8C shows the interleaved code of FIG. 8B arranged in rows and columns.
Figure 8A:
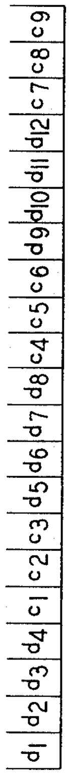
FIG. 8A shows 21 bits of a (7,4) block code known in the prior art.
Figure 8B:
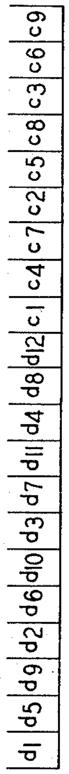
FIG. 8B shows the block code of FIG. 8A interleaved to degree 3.

As stated, the above-described noninterleaved code is useful for checking single-bit errors spaced no closer than 24 bits apart in the data stream. Interleaving the code, however, allows the checking and correction of groups or bursts of adjacent errors. For example, interleaving a code to degree $n$ allows the detection and correction of error bursts of $n$ adjacent digits. Interleaving may be better understood by reference to FIG. 8A. FIG. 8A shows 21 bits of a so-called (7,4) block code. Such a code is characterized by four adjacent data bits followed by three adjacent check bits. FIG. 8B shows the (7,4) block code of FIG. 8A interleaved to degree $n$=3. In accordance with FIG. 8B then, it is seen that $d_1$, $d_5$ and $d_9$, the leftmost bit of each group of four data bits in the 21-bit sequence, are the three leftmost bits of the interleaved code. Similarly, $d_2$, $d_6$ and $d_{10}$ are the second three data bits of the interleaved sequence counting from left to right. The remaining data bits are arranged in a similar manner. In general, then, in a code interleaved to degree $n$, the 1$^{st}$ bit, the (1+$n$)th bit, the (1+2$n$)th bit, the (1+3$n$)th bit, etc., are consecutive bits in a non-interleaved code. Similarly, the (2+$n$)th bit, (2+2$n$)th bit and (2+3$n$)th bit are also so related. These related sequences of data bits will be referred to as subsequences. Clearly, the bits in each of the subsequences are completely independent from the bits in each other subsequence. FIG. 8C shows the interleaved code and its relationship to the subsequences, each of which occupies a row thereof.

By choosing a degree of interleaving that is relatively prime to six, the period of the above-described noninterleaved (24, 20) code, encoding and decoding for the interleaved code can be advantageously accomplished with procedures and circuits that differ only slightly from those of the preferred circuits described above. In particular, the framing clock circuit remains completely unaltered.

Encoder For Interleaved Code

An encoder, in accordance with one embodiment of the present invention, for the interleaved code employs a circuit similar to that of FIG. 3. In particular, the circuit of FIG. 3 is modified to include 126 additional shift register stages to the left of each of the shift register stages of FIG. 3 for a total shift register capacity of at least 508 bits. The encoder of the preferred embodiment of the present invention for encoding an interleaved code is shown in FIG. 9 and utilizes the registers 909, 910, 911 and 912 which are each 127-bit shift registers. These shift registers are shifted by a serial bit clock once for each data and check bit transmitted. The circuit operates almost exactly as the circuit described for a code without interleaving. Thus, for five-bit intervals, data phase A through data phase E of the framing period, switch 913 is in the position shown in FIG. 9. Data bits are simultaneously presented to the encoder and also directly to transmission circuitry via lead 900. Switches 901, 902, 903 and 904 are operated directly by the three framing counter stages (however, switch 904 is again, closed). As in the circuit of FIG. 3 the switches control the addition of data bits to the partially summed check bits in the registers according to the rules expressed in the check matrix of the code. During the check phase of the framing period, switch 913 assumes its alternate position. A parity bit at the output of register 912 is presented for transmission and one bit is shifted from register 909 to register 910, one bit shifts from 910 to 911, one from 911 to 912 and a 0 bit shifts into register 909.

Reflecting on the fact that switch 913 of the encoder operates with a periodicity corresponding to six shifts of the registers, but that the registers are each 127 bits long, it becomes clear that each check bit appears six times at the output of any register before it shifts on to the next register. The first five appearances are at times when switch 913 is in the position shown in FIG. 9, resulting in the bit being fed back into the same register. At the sixth appearance switch 913 is in its alternate position, and the bit shifts into the next register to the right except the bit in register 912 which "shifts" to the transmission channel.

Any two consecutive appearances of some partially completed check bit at a register output are separated by the appearance of 126 other check bits. This corresponds to the transmission from the encoder of one bit from each of the other 126 subcodes that are interleaved in the complete code. The appearance of any (partially summed) check bit six times at the same register output, on the other hand, corresponds to the fact that, within any subcode, five additional data bits are processed for every check bit that emerges from the encoder. (This is not to be confused with the fact that any check bit is the modulo-2 sum of 15 data bits, — these 15 data bits are scattered over a span of 23 bits in the subcode, and indeed are distributed over a span of 2,795 bits in the transmitted data stream.)

Figure 10:
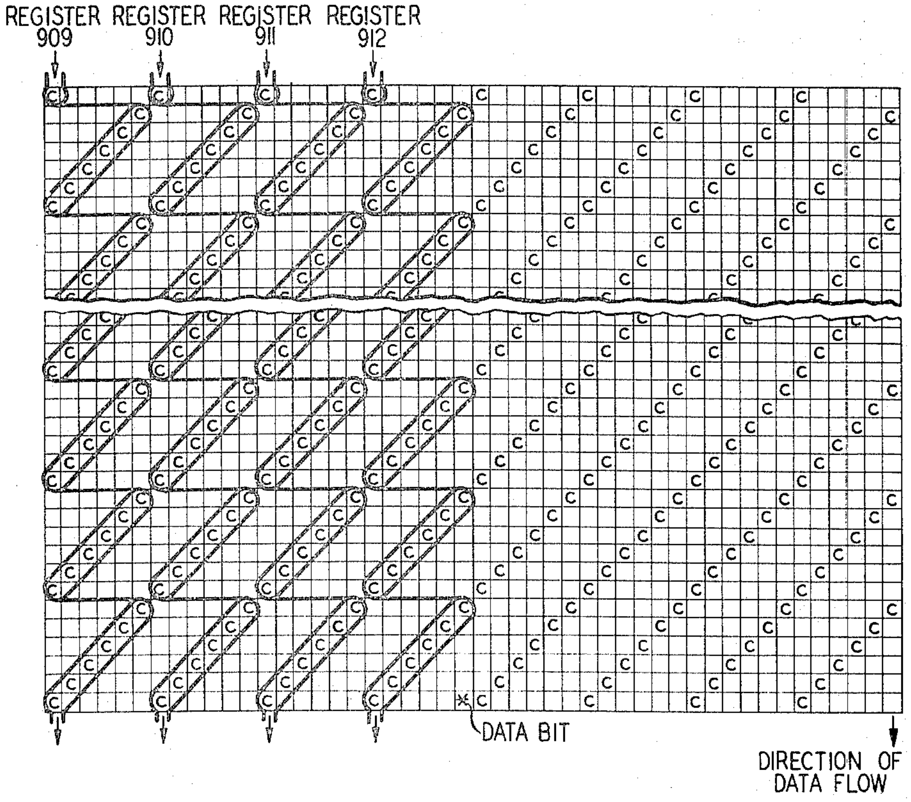
FIG. 10 illustrates the relationship between check bits and data bits for the interleaved code utilized in one embodiment of the present invention during one interval.

To verify the fact that the circuit of FIG. 9 actually accomplishes encoding for the interleaved code, refer to FIG. 10, which shows a segment of the interleaved coded data stream. The direction of data flow is from the upper left to the lower right. That is, bits enter at the upper left, flow down the leftmost column, emerge from the bottom of the leftmost column and enter the top of the column immediately to the right, flow down that column, etc., and out the bottom of the rightmost column. Also, the symbol *c* indicates a check bit. The data bit symbols have been omitted for clarity. The state of the system at phase A of some framing period is indicated. The data bit identified by an asterisk in FIG. 10 is the bit currently being presented to the encoding terminal for transmission. (From the above description, it is clear that each row of FIG. 10 represents a subsequence including the parity bits associated with that subsequence.) The bits stored in the four 127-bit shift registers of the encoder are identified in FIG. 10. These bits are partially summed check bits for the digits in the rows in which they occur.

When a data bit, such as that designated by an asterisk in FIG. 10, has been presented to the encoder, the four registers will shift. The output of register 909 is incremented (modulo-2) by the value of the data bit and shifted into the input of register 909 (recall that switch 901 is closed during phase A). Similarly, the output of register 910 is incremented and fed back to the register's input. The output of register 911 is shifted into the register 911 input unaltered (switch 903 is open during phase A). The output bit of register 912 is also incremented and shifted back into register 912.

When the next data bit is presented to the encoder, the framing clock will be at phase B and the situation will be as indicated in FIG. 11, where again the data bit currently being presented for transmission and encoding is indicated by an asterisk. Since the clock is at phase B, the output signals from registers 909 and 910 will be applied to their respective input terminals unaltered (switches 901 and 902 are open at this time). The bit being shifted out of register 911 will be incremented by the value of the data bit and applied to the input of register 911 (switch 903 is closed during phase B); and similarly the bit emerging from register 912 will be incremented and fed back into register 912.

Figure 11:
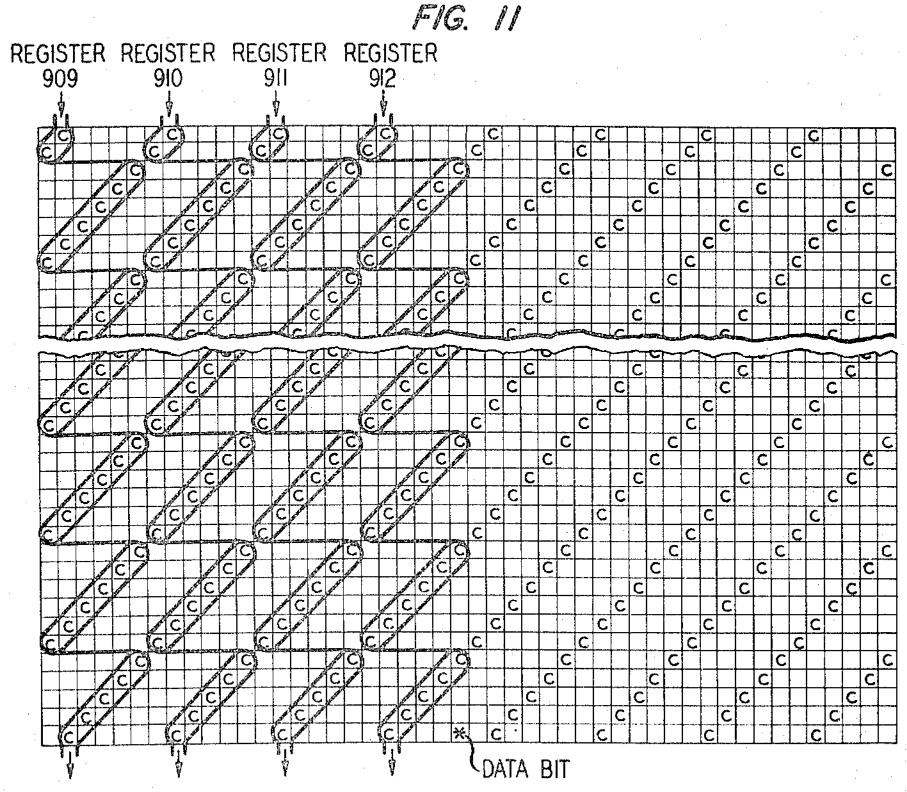
FIG. 11 shows a relationship similar to that shown in FIG. 10 for a different interval.

Examining the data bit position marked by an asterisk in FIG. 11, within its row, that is, within the subsequence to which it belongs, it is seen that it is in the position of a "phase B data bit." The check bits that follow it within that subsequence, that is, in that row of FIG. 11, should check it as they would, say, bit 2 of FIG. 2. And, indeed, as seen above this is precisely the manner in which they do check it. Similarly, looking at the data bit previously processed, that is, the data bit position marked by an asterisk in FIG. 10 it is seen that it was a "phase A data bit," and indeed the check bits within its subsequence had accounted for it according to the appropriate column of the check matrix of the underlying code.

During the next three phases of the framing clock, three additional data bits will be presented to the encoder. The contents of the four shift registers will shift three times, with each register's output incremented in accordance with the code matrix, by the values of the data bits being applied to the register's input.

During the next phase of the framing clock, a check phase, a check bit is to be transmitted. In particular, the check bit that appears in the column nearest the data bit position marked with asterisks in FIGS. 10 and 11 is to be transmitted. But when the framing clock has advanced to the check phase that check bit will appear at the output of register 912. At this time switch 913 of the encoder assumes its alternate position and the check bit is transmitted. The partially summed check bit emerging from register 911 is shifted unaltered into register 912, and similarly the check bits emerging from registers 909 and 910 shift into registers 910 and 911, respectively. A 0 bit shifts into register 909.

During the next bit interval, the framing clock is in phase A again, the system corresponds to FIG. 10 again, and the pattern of activity in the encoder repeats itself in the manner described above.

Decoder for Interleaved Code

The syndrome calculator circuit for the noninterleaved code, it may be recalled, differs from the encoder for the noninterleaved code only to the extent that the output of the syndrome circuit is derived from the input to the rightmost shift register rather than the output thereof. The syndrome generator for the interleaved code includes a similar modification to the encoder for the interleaved code. The syndrome generator for the interleaved code is shown in FIG. 12 and includes shift registers 1209, 1210, 1211 and 1212 and switches 1201, 1202, 1203 and 1204.

The decoder circuit for the interleaved code also includes error correction circuitry as shown in FIG. 13. The syndrome registers shift at the data transmission serial bit rate, that is, once for each bit received from the channel. Switch 1213 of FIG. 12 operates with the periodicity of the framing clock. It is in the position shown in FIG. 12 for 5 shifts, while five data bits are being received, and it assumes the alternate position for one shift, while a check bit is being received. This corresponds to the instant an additional syndrome bit has been calculated and is available for shifting into the syndrome register. The data register 1301 shifts 5 times during the framing cycle, once for each data bit received.

Since the syndrome registers of FIG. 13 are 127 bits long, and switch 1213 operates on a six bit cycle, the same set of four syndrome bits appears at the same register output terminal 6 times. This provides the opportunity to correct an error in any of the five phases of the data stream at the moment the erroneous bit emerges from the data register 1301.

Thus, assume the digit denoted by an asterisk in FIG. 10 were the digit in the rightmost stage of shift register 1301 in FIG. 13. The syndrome bits available at the output terminals of shift registers 1303, 1304, 1305 and 1306 are, then, those derived, in part, from the four check bits immediately to the left of the denoted data bit in its subsequence. Again, since the interleaved code is relatively prime to 6, thereby maintaining the correct subsequences, the framing counter is the same as that for the noninterleaved code and the framing counter signals X, Y and Z are as shown in FIG. 4B. As with the error correction circuit of FIG. 7, the exclusive-OR circuits 1307, 1308 and 1309 and inverter 1310 signal a match between the framing counter signals X, Y and Z and the syndrome bits in shift registers 1303, 1304 and 1305, respectively. Exclusive-OR circuit 1311, responsive to inverter 1310, inverts those data bits thus indicated to be in error.

While the equipments of this invention have been described with reference to a particular embodiment, it is to be understood that such an embodiment is intended to be illustrative of the present invention and that numerous other arrangements may be devised by those skilled in the art without departing from the spirit and scope of the invention.

For example, the noninterleaved code described herein may be interleaved to any degree relatively prime to 6. The circuits of the preferred embodiment may be then adjusted by simply increasing the number of shift register stages appropriately. Alternatively, codes having different code rates may be used and the encoding and decoding circuitry altered accordingly without departing from the spirit and scope of the present invention.

What is claimed is:

1. In a communication system for communicating an input sequence of data signals over a communications channel, said system comprising a transmitter and a receiver coupled to the respective ends of said channel, the improvement comprising an encoder at said transmitter comprising an ordered plurality of adders, each having first and second input terminals and an output terminal, each of said adders comprising means for generating signals at said output terminal representative of the sum of signals appearing at said first and second input terminals, an equal plurality of memory devices, each of said devices having an input terminal and an output terminal, each of said memory devices being initially in a cleared state, means for applying data signals in said input sequence to said second input terminal of selected ones of said adders, means for connecting the output terminal of each of said memory devices to the first input terminal of a corresponding one of said adders, means for selectively connecting the input terminal of each of said memory devices to the output terminal of said corresponding one of said adders, whereby there is formed and stored in said memory devices a sequence of sums, said sequence of sums including an initial sum and successive updated sums of selected ones of said input sequence of data signals and previously stored sums, and means for periodically applying one of said updated sums to said channel to constitute parity signals associated with said input data signals.

2. A system in accordance with claim 1 wherein each of said adders is a modulo-2 adder.

3. A system in accordance with claim 2 further comprising means for periodically transferring the sum stored in each memory device, except the last, to another memory device.

4. A system in accordance with claim 3 wherein said means for periodically applying parity signals to said channel comprises means for applying the updated sum stored at the last of said memory devices to said channel.

5. A system in accordance with claim 4 further comprising means for initializing the contents of said memory device associated with each of said adders.

6. A system according to claim 5 further including encoder control means for generating signals to control said means for periodically applying one of said updated sums to said channel.

7. A system according to claim 6 wherein said means for applying data signals in said input sequence comprises means at each of said modulo-2 adders for selectively applying said input sequence of data signals to said second input terminal of each of said modulo-2 adders in response to signals from said encoder control means.

8. In a communications system for communicating an input sequence of data signals over a communications channel, said system comprising a transmitter and a receiver coupled to respective ends of said channel, said transmitter comprising means for generating and applying to said channel parity signals based on said data signals, wherein the improvement comprises an encoder at said receiver for generating parity signals in response to data signals received from said channel, said encoder comprising an ordered plurality of adders, each having first and second input terminals and an output terminal, each of said adders comprising means for generating signals at said output terminal representative of the sum of signals appearing at said first and second input terminals, an equal plurality of memory devices, each of said devices having an input terminal and an output terminal, each of said memory devices being initially in a cleared state, means for applying data signals in said input sequence to said second input terminal of selected ones of said adders, means for connecting the output terminal of each of said memory devices to the first input terminal of a corresponding one of said adders, means for selectively connecting the input terminal of each of said memory devices to the output terminal of said corresponding one of said adders, whereby there is formed and stored in said memory devices a sequence of sums, said sequence of sums including an initial sum and successive updated sums of selected ones of said data signals received from said channel and previously stored sums.

9. A system according to claim 8 further comprising means for comparing parity signals generated at said receiver with parity signals received from said channel.

10. A system according to claim 9 wherein each of said adders is a modulo-2 adder.

11. A system according to claim 10 further comprising encoder control means for generating control signals to control said means for comparing parity signals generated at said receiver with parity signals received from said channel.

12. A system according to claim 11 wherein said means for applying comprises means at each of said modulo-2 adders for selectively applying said signals from said channel to the second input terminal of said modulo-2 adders in response to control signals from said encoder control means.

13. A system according to claim 12 further including means for periodically transferring the sum stored at each memory device at each adder, except the last, to another memory device.

14. Apparatus according to claim 13 wherein said means for comparing parity signals generated at said receiver with parity signals received from said channel comprises means for simultaneously applying said updated sum at the last of said adders to said first input terminal of said last adder and the parity signal from said channel to said second input terminal of said last adder.

15. Apparatus according to claim 14 further including means at said receiver for inverting selected ones of said data signals received from said channel in response to said means for comparing parity signals generated at said receiver with parity signals received from said channel.

16. In a data transmission system including a transmission channel interconnecting a transmitter and a receiver for detecting and correcting error bursts of *n* bits in length in an input sequence of data signals from a data source, an encoder in said transmitter comprising, encoder control means a plurality of exclusive-OR circuits, each having first and second input terminals and an output terminal, a first set of encoder switches responsive to said encoder control means, one in each path connecting each of said encoder exclusive-OR first input terminals to said source of data signals, a plurality of n-stage shift registers for delaying and reapplying signals from each of said exclusive-OR output terminals to said second input terminal thereof, means responsive to said encoder control means for transferring signals from selected ones of said shift registers to different selected ones of said shift registers, and means responsive to said encoder control means for applying signals stored in a selected one of said shift registers to said channel.

17. A system as in claim 16 further including a decoder in said receiver, comprising, decoder control means, a plurality of decoder exclusive-OR circuits each having first and second input terminals and an output terminal, a plurality of n-stage shift registers arranged to delay and reapply signals at each of said decoder exclusive-OR output terminals to the second input terminal thereof, a first set of decoder switches one at each decoder exclusive-OR circuit for selectively applying signals from said channel to said decoder exclusive-OR first input terminals in response to said decoder control means, means for applying signals from each of said shift registers, except one, to a different one of said shift registers, and means for generating syndrome signals in response to said signals stored in a selected one of said encoder shift registers applied to said decoder by means of said channel with signals stored in a selected one of said decoder registers.

18. Apparatus according to claim 17 wherein said decoder further includes means for inverting selected ones of said data signals received from said channel in response to a match between certain ones of said syndrome signals and signals generated by said decoder control means.

* * * * *